(12) United States Patent
Last et al.

(10) Patent No.: US 11,647,287 B1
(45) Date of Patent: May 9, 2023

(54) AUTOFOCUS ACTUATOR

(71) Applicant: Waymo LLC, Mountain View, CA (US)

(72) Inventors: Matthew Last, San Jose, CA (US); Benjamin Frevert, Mountain View, CA (US); Matthew Rinehart, San Mateo, CA (US); Shashank Sharma, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 358 days.

(21) Appl. No.: 16/701,978

(22) Filed: Dec. 3, 2019

(51) Int. Cl.
*G02B 7/08* (2021.01)
*H04N 23/67* (2023.01)
*G01S 7/481* (2006.01)
*G02B 7/09* (2021.01)
*B60R 11/04* (2006.01)

(52) U.S. Cl.
CPC ............. *H04N 23/67* (2023.01); *B60R 11/04* (2013.01); *G01S 7/4816* (2013.01); *G02B 7/09* (2013.01)

(58) Field of Classification Search
CPC .......... H02N 2/06; H02N 2/101; H02N 2/021; G02B 7/08; G02B 7/102; G02B 7/028; H01L 41/0913; G03B 3/10; G03B 2217/18; G03B 2205/0061; G03B 17/14; G03B 2205/0046; G06F 3/016
See application file for complete search history.

(56) References Cited

U.S. PATENT DOCUMENTS

| | | | |
|---|---|---|---|
| 5,101,278 | A | 3/1992 | Itsumi et al. |
| 7,529,476 | B2 | 5/2009 | Kurosawa |
| 8,098,289 | B2 | 1/2012 | Chiou et al. |

(Continued)

FOREIGN PATENT DOCUMENTS

| | | |
|---|---|---|
| CN | 104717434 | 6/2015 |
| KR | 20160006435 | 1/2016 |

(Continued)

OTHER PUBLICATIONS

United States Patent and Trademark Office, Notice of Allowance dated Sep. 7, 2021, issued in connection with U.S. Appl. No. 16/702,054, filed Dec. 3, 2019, 10 pages.

(Continued)

*Primary Examiner* — Patrick E Demosky
(74) *Attorney, Agent, or Firm* — McDonnell Boehnen Hulbert & Berghoff LLP

(57) ABSTRACT

The present disclosure relates to systems, vehicles, and methods that include adjusting a position of an image sensor with respect to a lens assembly. An example optical system includes a lens assembly having at least one lens. The at least one lens defines an optical axis, a focal distance, and a focal plane. The optical system also includes a lens holder coupled to the lens assembly and a substrate having a first surface. The optical system additionally includes an image sensor attached to the first surface of the substrate. Furthermore, the optical system includes an active compensation system having a piezoelectric structure coupled between the lens holder and the first surface of the substrate. The active compensation system is configured to maintain the image sensor at the focal plane over a predetermined temperature range.

19 Claims, 12 Drawing Sheets

(56) References Cited

U.S. PATENT DOCUMENTS

| | | | |
|---|---|---|---|
| 8,284,297 B2 | 10/2012 | Chou | |
| 8,994,298 B2 | 3/2015 | Inaji et al. | |
| 9,376,066 B2 | 6/2016 | Lu | |
| 9,578,217 B2 | 2/2017 | Gutierrez et al. | |
| 9,621,769 B2 | 4/2017 | Mai et al. | |
| 9,807,286 B2 | 10/2017 | Kim | |
| 9,917,991 B2 | 3/2018 | Topliss | |
| 10,136,040 B2 | 11/2018 | Topliss et al. | |
| 10,257,933 B1 | 4/2019 | Hassemer et al. | |
| 10,890,733 B2 * | 1/2021 | Alasirniö | G02B 7/09 |
| 10,965,848 B1 | 3/2021 | Ba-Tis | |
| 2007/0030573 A1 * | 2/2007 | Batchko | B33Y 50/02 |
| | | | 359/665 |
| 2008/0079829 A1 | 4/2008 | Choi et al. | |
| 2008/0237443 A1 | 10/2008 | Oliver et al. | |
| 2008/0284860 A1 | 11/2008 | Wu et al. | |
| 2011/0285890 A1 | 11/2011 | Choi et al. | |
| 2012/0087023 A1 * | 4/2012 | Ashizawa | H02N 2/06 |
| | | | 310/317 |
| 2012/0170920 A1 * | 7/2012 | Moreau | G02B 3/12 |
| | | | 359/666 |
| 2012/0287328 A1 * | 11/2012 | Kawai | G03B 3/10 |
| | | | 348/E5.042 |
| 2013/0194466 A1 | 8/2013 | Cheng et al. | |
| 2014/0036084 A1 * | 2/2014 | Lu | H04N 5/23212 |
| | | | 348/148 |
| 2015/0192750 A1 | 7/2015 | Shiraishi | |
| 2018/0171991 A1 | 6/2018 | Miller et al. | |
| 2019/0004276 A1 * | 1/2019 | Tabuchi | G02B 7/28 |
| 2019/0028620 A1 | 1/2019 | Park | |
| 2019/0289218 A1 | 9/2019 | Liu | |
| 2020/0393691 A1 | 12/2020 | Owens et al. | |
| 2021/0132327 A1 | 5/2021 | Sharma et al. | |

FOREIGN PATENT DOCUMENTS

| | | |
|---|---|---|
| KR | 102169418 | 10/2020 |
| WO | 2014/074250 | 5/2014 |
| WO | 2021/040397 | 3/2021 |
| WO | WO-2021073069 A1 * | 4/2021 |

OTHER PUBLICATIONS

Blahnik et al., "Smartphone imaging technology and its applications," Adv. Opt. Techn., 2021, pp. 145-232, vol. 10, No. 3.

Galaom, Ahmed Abdurabu Nasser, "Integrationof a MEMS-based Autofocus Actuator into a Smartphone Camera," Thesis—Mechanical and Industrial Engineering, University of Toronto, 2016, 123 pages.

La Rosa et al., "Optical Image Stabilization (OIS)," https://www.stmicroelectronics.com.cn/content/ccc/resource/technical/document/white_paper/c9/a6/fd/e4/e6/4e/48/60/ois_white_paper.pdf/files/ois_white_paper.pdf/jcr:content/translations/en.ois_white_paper.pdf, 2015, 26 pages.

* cited by examiner

AUTOFOCUS ACTUATOR

BACKGROUND

Conventional optical systems (e.g., single lens reflex (SLR) camera lens systems) may utilize an autofocus apparatus to control a relative distance between a movable lens and/or lens set with respect to an image sensor. In some cases, such optical systems may actuate the moveable lens or lens set with a screw drive, a voice coil, an ultrasonic motor, or a stepper motor actuator.

SUMMARY

The present disclosure relates to systems, vehicles, and methods that involve an active compensation system having a piezoelectric structure to control a relative distance or arrangement between an image sensor and a lens or a set of lenses.

In a first aspect, an optical system is provided. The optical system includes a lens assembly having at least one lens. The at least one lens defines an optical axis, a focal distance, and a focal plane. The optical system also includes a lens holder coupled to the lens assembly and a substrate having a first surface. The optical system additionally includes an image sensor attached to the first surface of the substrate. The optical system further includes an active compensation system having a piezoelectric structure coupled between the lens holder and the first surface of the substrate. The active compensation system is configured to maintain the image sensor at the focal plane over a predetermined temperature range.

In a second aspect, a method is provided. The method includes receiving information indicative of a relative position of an image sensor with respect to a lens assembly. The lens assembly includes at least one lens. The at least one lens defines an optical axis, a focal distance, and a corresponding focal plane. The method also includes determining a control signal based on the relative position of the image sensor with respect to the lens assembly and providing the control signal to an active compensation system. The active compensation system includes a piezoelectric structure coupled between the image sensor and the lens assembly.

Other aspects, embodiments, and implementations will become apparent to those of ordinary skill in the art by reading the following detailed description, with reference where appropriate to the accompanying drawings.

DETAILED DESCRIPTION

Figure 1:
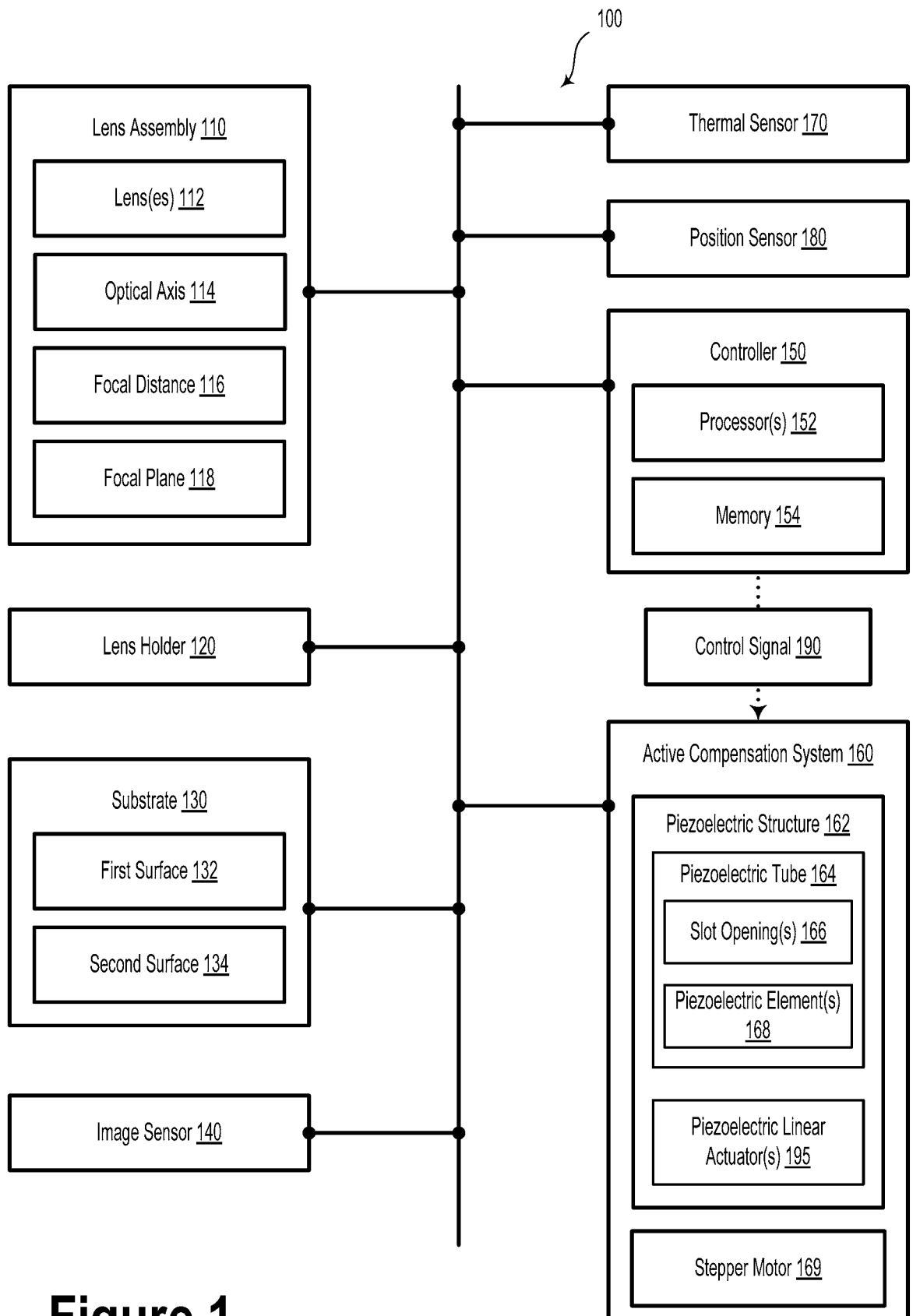
FIG. 1 illustrates an optical system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Camera modules may be designed to give high performance over a wide temperature range. However, such camera modules are often formed from several different materials, each having respective properties (e.g., size, shape, optical power) that change at different rates as the respective materials change in temperature.

Utilizing passive athermalization can partially offset or mitigate temperature-dependent changes in material size, etc. However, manufacturing process variability and imperfect athermalization models make it difficult or impossible to perfectly offset the effects of temperature change in a given camera module. Such effects include, but are not limited to, defocusing of the image at the image sensor, optical aberrations, mechanical stress, etc.

Accordingly, it is desirable to be able to tune the thermal performance of a given optical system on an active and/or dynamic basis to reduce the impact of thermal effects. A new lens holder design is proposed that provides both passive thermal focus compensation and active feedback control of mechanical back focal length. In an example embodiment, a piezoelectric actuator can be arranged between a lens holder and a substrate on which an image sensor is mounted. The piezoelectric actuator may include a piezoelectric tube and/or a stack of two or more linear piezoelectric actuators, among other possibilities. In such a scenario, the length of the piezoelectric actuator and/or portions thereof can be controllably adjusted so as to maintain the image sensor at the focal plane.

In some embodiments, the length and/or placement of the piezoelectric actuator and/or piezoelectric elements mounted to the actuator could be designed or configured to effectively compensate for thermal focus shift movement due to differences in the coefficient of thermal expansion (CTE) of various materials in the optical system. As an example, thermal focus shifts could be ±0.15 microns/° C. from −30 to 65° C.

In an example embodiment, a temperature sensor could provide a current temperature of the optical system. In such a scenario, the voltage and/or current applied to the piezoelectric actuator could be based on the current temperature so as to dynamically compensate for thermal focus shift.

Such an optical system could optionally be designed to provide passive athermalization. For example, the materials of the optical system could be selected so as to provide similar CTEs and/or to minimize thermal focus shift. In some embodiments, the piezoelectric actuator could be configured to adjust a position of the substrate with respect to the lens holder by 20-50 microns or more.

II. Example Optical Systems

FIG. 1 illustrates an optical system 100, according to an example embodiment. The optical system 100 includes a lens assembly 110. The lens assembly 110 includes at least one lens 112. In such scenarios, the at least one lens 112 may define an optical axis 114, a focal distance 116, and a focal plane 118. The at least one lens 112 could include, for example, a spherical lens, an aspherical lens, a cylindrical lens, a Fresnel lens, a gradient index lens, and/or a diffractive optical lens, among other possibilities. The at least one lens 112 could be formed from plastic, glass, or another optical material.

The optical system 100 includes a lens holder 120, which may be coupled to the lens assembly 110.

The optical system 100 includes a substrate 130 having a first surface 132 and a second surface 134. In some embodiments, the substrate 130 could include a printed circuit board, a semiconductor substrate, or another flexible or rigid body.

The optical system 100 additionally includes an image sensor 140 attached to the first surface 132 of the substrate 130.

The optical system 100 also includes an active compensation system 160. The active compensation system 160 includes a piezoelectric structure 162 coupled between the lens holder 120 and the first surface 132 of the substrate 130. In some embodiments, at least a portion of the piezoelectric structure 162 could be arranged coaxially about the optical axis 114.

In some embodiments, the piezoelectric structure 162 could include a piezoelectric tube 164. For example, the piezoelectric tube 164 could be a piezoelectric tube actuator, such as Thorlabs PT49LM or PI PT120-PT140 Series piezo tubes. It will be understood that other sizes and/or types of piezoelectric tubes are possible and contemplated. In some embodiments, the piezoelectric tube 164 could be configured to provide a desired axial expansion/contraction value and/or a desired diameter expansion/contraction value based on a known or expected thermally-induced expansion or contraction of various components of the optical system 100.

In some examples, the piezoelectric tube 164 could include a plurality of slot openings 166 along at least one end of the piezoelectric tube 164. In such a scenario, the plurality of slot openings 166 could be configured to reduce thermally-induced radial strain in the piezoelectric tube 164 and/or reduce undesirable diameter expansion/contraction.

In various examples, the piezoelectric structure 162 could include a plurality of piezoelectric elements 168 disposed on a surface of the piezoelectric tube 164. In such a scenario, each of the piezoelectric elements 168 could be configured to be separately controllable so as to adjust at least one of: i) a distance between the at least one lens 112 and the image sensor 140; or ii) a tip or tilt of the image sensor 140 with respect to the focal plane 118. In some embodiments, the piezoelectric elements 168 could be controlled so as to adjust other aspects of the geometric arrangement of elements in the optical system 100.

In other embodiments, the piezoelectric structure 162 could additionally or alternatively include piezoelectric linear actuator(s) 195. For example, the piezoelectric linear actuator(s) 195 may include a plurality of piezoelectric linear actuators stacked on top of one another, such as PI P-010.xxH-P-025.xxH (e.g., P-010.20H) or similar linear actuators. It will be understood that other sizes and/or types of piezoelectric linear actuators are possible and contemplated. In some embodiments, the piezoelectric linear actuator 195 could be configured to provide a desired axial expansion/contraction value based on a known or expected thermally-induced expansion or contraction of various components of the optical system 100.

In some implementations, the piezoelectric linear actuator(s) 195 could form two or more stacks or posts arranged at respective positions along the substrate 130. For example, piezoelectric linear actuator(s) 195 may form four stacks, with a first stack positioned above the image sensor 140, a second stack positioned below the image sensor 140, a third stack positioned to the right of the image sensor 140, and a fourth stack positioned to the left of the image sensor 140. In such a scenario, each of the stacks could be configured to be separately controllable so as to adjust at least one of: i) a distance between the at least one lens 112 and the image sensor 140; or ii) a tip or tilt of the image sensor 140 with respect to the focal plane 118. In some embodiments, the stacks of piezoelectric linear actuator(s) 195 could be controlled so as to adjust other aspects of the geometric arrangement of elements in the optical system 100.

In some embodiments, the piezoelectric structure 162 could be electrically coupled to the lens holder 120 with a conductive epoxy. In other embodiments, the piezoelectric structure 162 could be coupled to the lens holder 120 by way of one or more fasteners.

The active compensation system 160 is configured to maintain the image sensor 140 at the focal plane 118 over a predetermined temperature range. In some embodiments, the predetermined temperature range could include a temperature range of −30 to 65° C. However, other predetermined temperature ranges are possible and contemplated.

In various embodiments, the active compensation system 160 could additionally include a stepper motor 169. For example, in some embodiments, the active compensation system 160 could include the piezoelectric structure 162 and a stepper motor 169, which could be configured to provide micro and macro movements in the axial direction. In other words, the piezoelectric structure 162 could be utilized to provide fine axial position adjustments (e.g., less than ±100 microns) and the stepper motor 169 could be configured to provide coarse axial position adjustments (e.g., greater than ±100 microns).

In some embodiments, the optical system 100 could include a camera system or a light detection and ranging (LIDAR) system. That is, the optical system 100 could include systems for capturing video and/or still images and/or LIDAR point cloud data.

In some embodiments, the optical system 100 could additionally include a thermal sensor 170. The thermal sensor 170 could be configured to provide information indicative of a current temperature of at least a portion of the optical system 100. In such a scenario, at least one property of the active compensation system 160 could be configured to be adjusted based on the current temperature. In some embodiments, the thermal sensor 170 could include a thermocouple, a thermometer, or another type of temperature-sensing device.

Additionally or alternatively, the optical system 100 could include a position sensor 180. The position sensor 180 could be configured to provide information indicative of a relative position of the image sensor 140 with respect to the lens assembly 110 and/or lens holder 120. In such scenarios, at least one property of the active compensation system 160 could be configured to be adjusted based on the relative position of the image sensor 140 with respect to the lens assembly 110 and/or the lens holder 120. In some embodiments, the position sensor 180 could include a capacitive displacement sensor, an ultrasonic sensor, a Hall effect sensor, an inductive sensor, an optical proximity sensor, a laser-doppler vibrometer, or a camera. Other types of position sensors are possible and contemplated.

In some embodiments, the optical system 100 could also include a controller 150. The controller 150 may have at least one processor 152 and a memory 154. Additionally or alternatively, the controller 150 may include at least one of a field-programmable gate array (FPGA) or an application-specific integrated circuit (ASIC). As an example, the one or more processors 152 may include a general-purpose processor or a special-purpose processor (e.g., digital signal processors, etc.). The one or more processors 152 may be configured to execute computer-readable program instructions that are stored in the memory 154. In some embodiments, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

In some embodiments, the operations executable by the controller 150 could include determining a control signal 190 to compensate for a thermal focus shift between the at least one lens 112 and the image sensor 140. In such scenarios, the operations may also include providing the control signal 190 to the active compensation system 160.

In embodiments involving a thermal sensor 170, the operations could additionally or alternatively include receiving, from the thermal sensor 170, information indicative of a current temperature of at least a portion of the optical system 100. In such scenarios, determining the control signal 190 could be based, at least in part, on the current temperature.

In embodiments involving a position sensor 180, the operations may additionally or alternatively include receiving, from the position sensor 180, information indicative of a relative position of the image sensor 140 with respect to the lens assembly 110 and/or the lens holder 120. In such scenarios, determining the control signal 190 could be based on the relative position of the image sensor 140 with respect to the lens assembly 110.

Figure 2A:
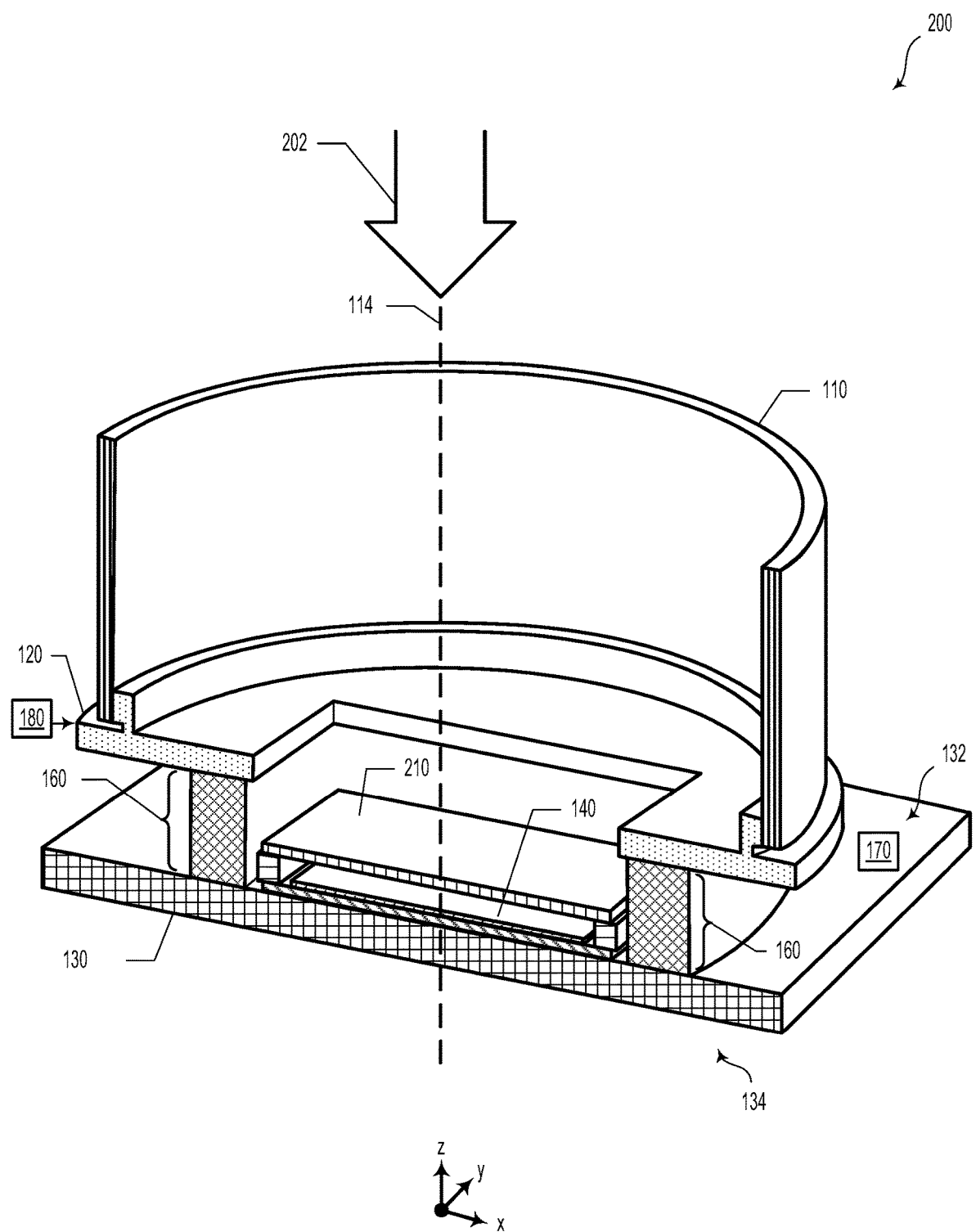
FIG. 2A illustrates an optical system, in accordance with example embodiments.

FIG. 2A illustrates an optical system 200, according to an example embodiment. Optical system 200 could include elements that are similar or identical to optical system 100, as illustrated and described in relation to FIG. 1. For example, optical system 200 includes a substrate 130 having a first surface 132 and a second surface 134. An image sensor 140 could be mounted directly or indirectly (e.g., via a readout integrated circuit (ROIC)) to the first surface 132 of the substrate 130. In some embodiments, an optical element 210 (e.g., an infrared filter) could be disposed along an optical axis 114.

The optical system 200 includes an active compensation system 160 disposed between a lens holder 120 and the substrate 130. The lens holder 120 is coupled to the lens assembly 110, which may include one or more lenses 112, which may define an optical axis 114, a focal distance 116, and/or a focal plane 118. The active compensation system 160 could be configured to control a relative position of the image sensor 140 with respect to the lens assembly 110 and/or the one or more lenses 112.

The optical system 200 may include a position sensor 180 and a thermal sensor 170. It will be understood that while FIG. 2A illustrates the position sensor 180 and the thermal sensor 170 at particular locations with respect to other elements of optical system 200, other locations of position sensor 180 and the thermal sensor 170 are possible and contemplated. Arrow 202 provides a reference point between the view of FIG. 2A and the views of FIGS. 2B, 3A, 3B, and 3C.

In some implementations, the active compensation system 160 may at least partially surround the image sensor 140 and/or the optical element 210, among other components. For example, piezoelectric tube 164 may continuously surround image sensor 140 (i.e., image sensor 140 may be disposed in an interior volume of the piezoelectric tube 164).

Figure 2B:
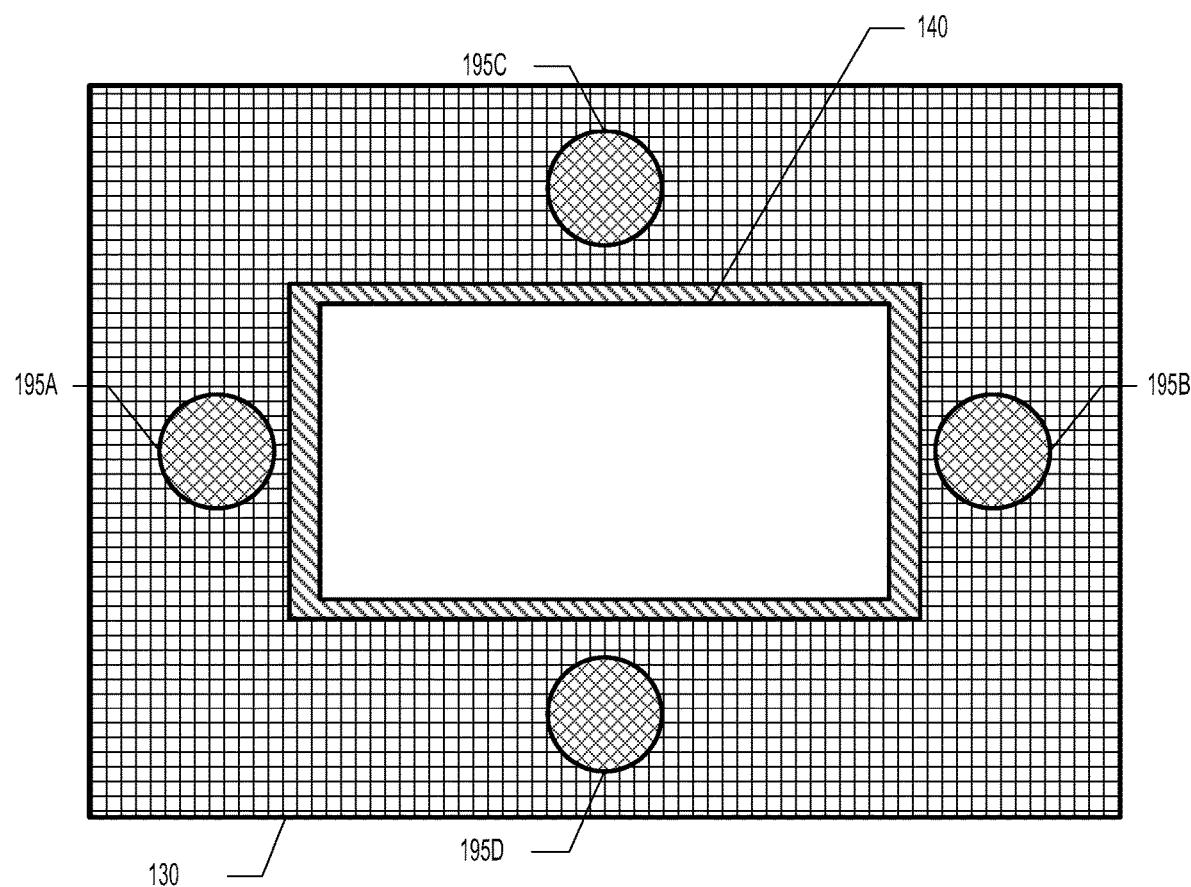
FIG. 2B illustrates an optical system, in accordance with example embodiments.

In another example, stacks of piezoelectric linear actuator(s) 195 may be disposed around the image sensor 140 in a discontinuous fashion, such that space between these stacks may remain vacant, as illustrated in FIG. 2B. FIG. 2B illustrates a cross-section of optical system 200 looking down along arrow 202 and cutting through active compensation system 160. Specifically, active compensation system may include four stacks of piezoelectric linear actuators 195 disposed around image sensor 140. Each of the stacks may extend into and out of the page, as drawn. First stack 195A may be positioned to the left of image sensor 140, second stack 195B may be positioned to the right of image sensor 140, third stack 195C may be positioned above image sensor 140, and fourth stack 195D may be positioned below image sensor 140. In other implementations, additional stacks of piezoelectric linear actuators 195 may be disposed between stacks 195A, 195B, 195C, and 195D (e.g., near each of the corners of image sensor 140).

Figure 3A:
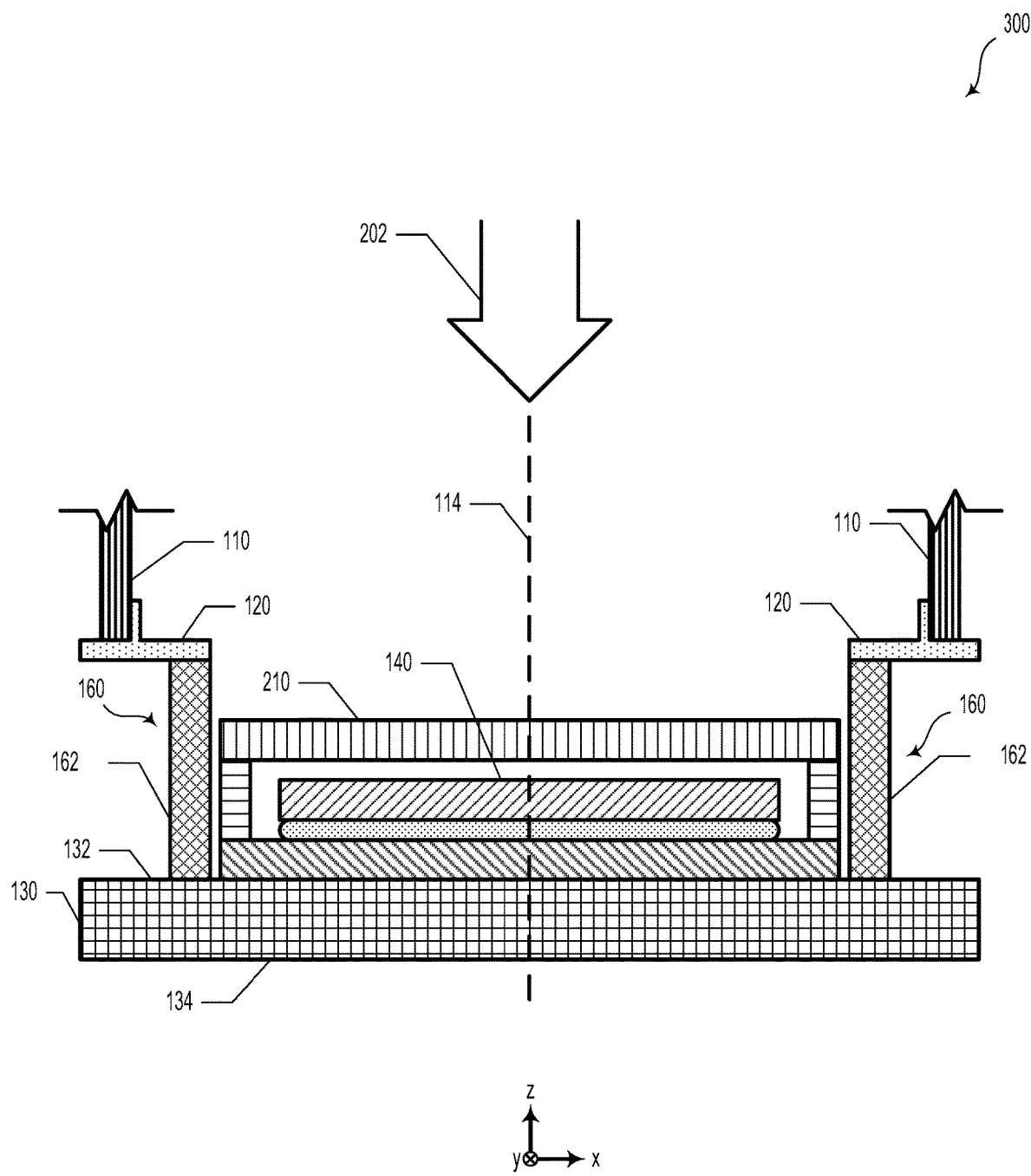
FIG. 3A illustrates an optical system, in accordance with example embodiments.

FIG. 3A illustrates an optical system 300, according to an example embodiment. At least some elements of optical system 300 could be similar or identical to optical systems 100 or 200, as illustrated and described in relation to FIGS. 1, 2A, and 2B. As illustrated in FIG. 3A, optical system 300 could include a "stackup" of the substrate 130, the piezoelectric structure 162 (which could be piezoelectric tube 164 and/or piezoelectric linear actuator(s) 195), the lens holder 120, and the lens assembly 110. Alternative stackups are possible and contemplated.

Figure 3B:
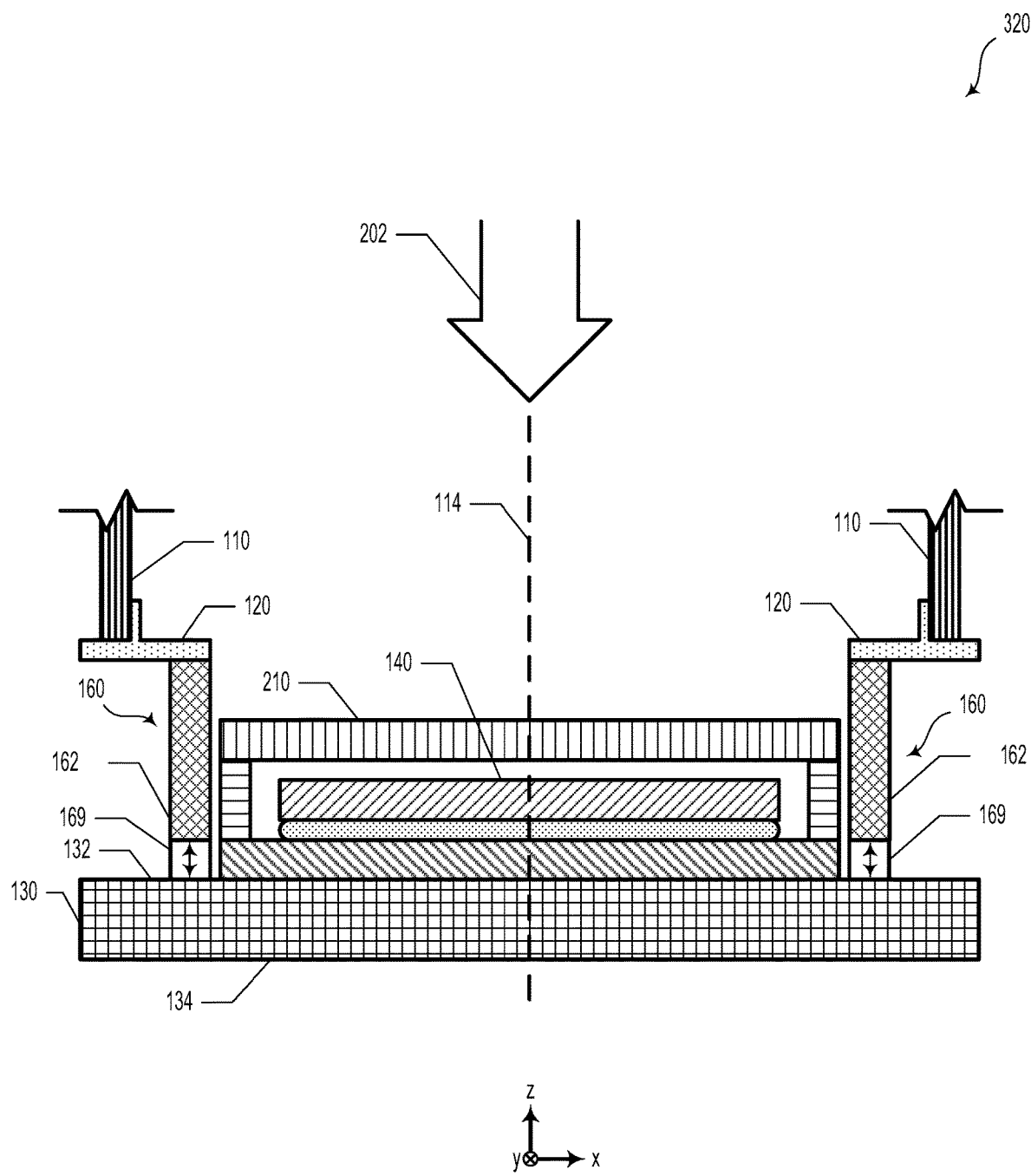
FIG. 3B illustrates an optical system, in accordance with example embodiments.

FIG. 3B illustrates an optical system 320, according to an example embodiment. Some elements of optical system 320 could be similar or identical to optical systems 100, 200, or 300, as illustrated and described in relation to FIGS. 1, 2A, 2B, and 3A. As illustrated in FIG. 3B, optical system 300 could include a "stackup" of the substrate 130, a stepper motor 169, the piezoelectric structure 162 (which could be a piezoelectric tube 164 and/or piezolelectric linear actuator(s) 195), the lens holder 120, and the lens assembly 110. Alternative stackups are possible and contemplated. In such scenarios, the stepper motor 169 could be configured to control large-scale movements (e.g., greater than ±100 microns) along the axial direction and the piezoelectric structure 162 could be configured to control smaller-scale movements (e.g., less than ±100 microns) along the axial direction.

Figure 3C:
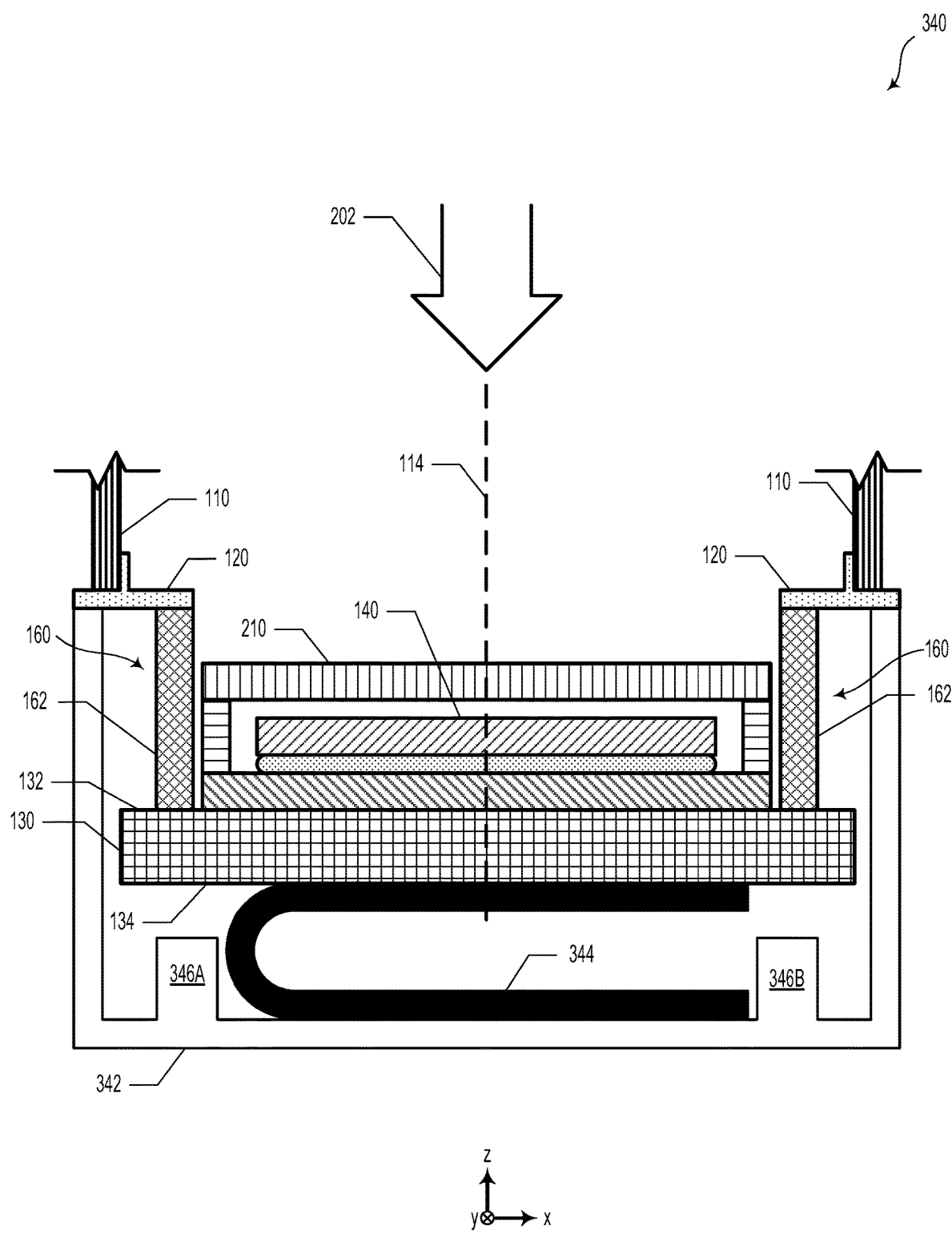
FIG. 3C illustrates an optical system, in accordance with example embodiments.

FIG. 3C illustrates an optical system 340, according to an example embodiment. Some elements of optical system 340 could be similar or identical to optical systems 100, 200, 300, or 320, as illustrated and described in relation to FIGS. 1, 2A, 2B, 3A, and 3B. As illustrated in FIG. 3C, optical system 300 could include a "stackup" of the substrate 130, the piezoelectric structure 162 (which could be a piezoelectric tube 164 and/or piezolelectric linear actuator(s) 195), the lens holder 120, the lens assembly 110, a housing 342, and a spring 344.

The housing 342 may be connected to the lens holder 120 so as to define a chamber between the housing 342, the lens assembly 110, and the lens holder 120. The chamber may contain the substrate 130, the image sensor 140, the piezoelectric structure 162, and the spring 344, among other components. The housing 342 may thus shield and protect these components from the outside environment. The spring 344 may be disposed between the housing 342 and the substrate 130 to bias the substrate 130 towards the lens assembly 110 and preload the piezoelectric structure 162. The housing 342 may include protrusions 346A and 346B that define a relief or space in which the spring 344 is retained to reduce or prevent drifting. The spring 344 may also provide a thermal path by way of which heat generated by the image sensor 140 may be dissipated to the outside environment. A thermal interface material (TIM) may be provided between the spring 344 and the housing 342, as well as between the spring 344 and the substrate 130, to further facilitate heat transfer.

Figure 4A:
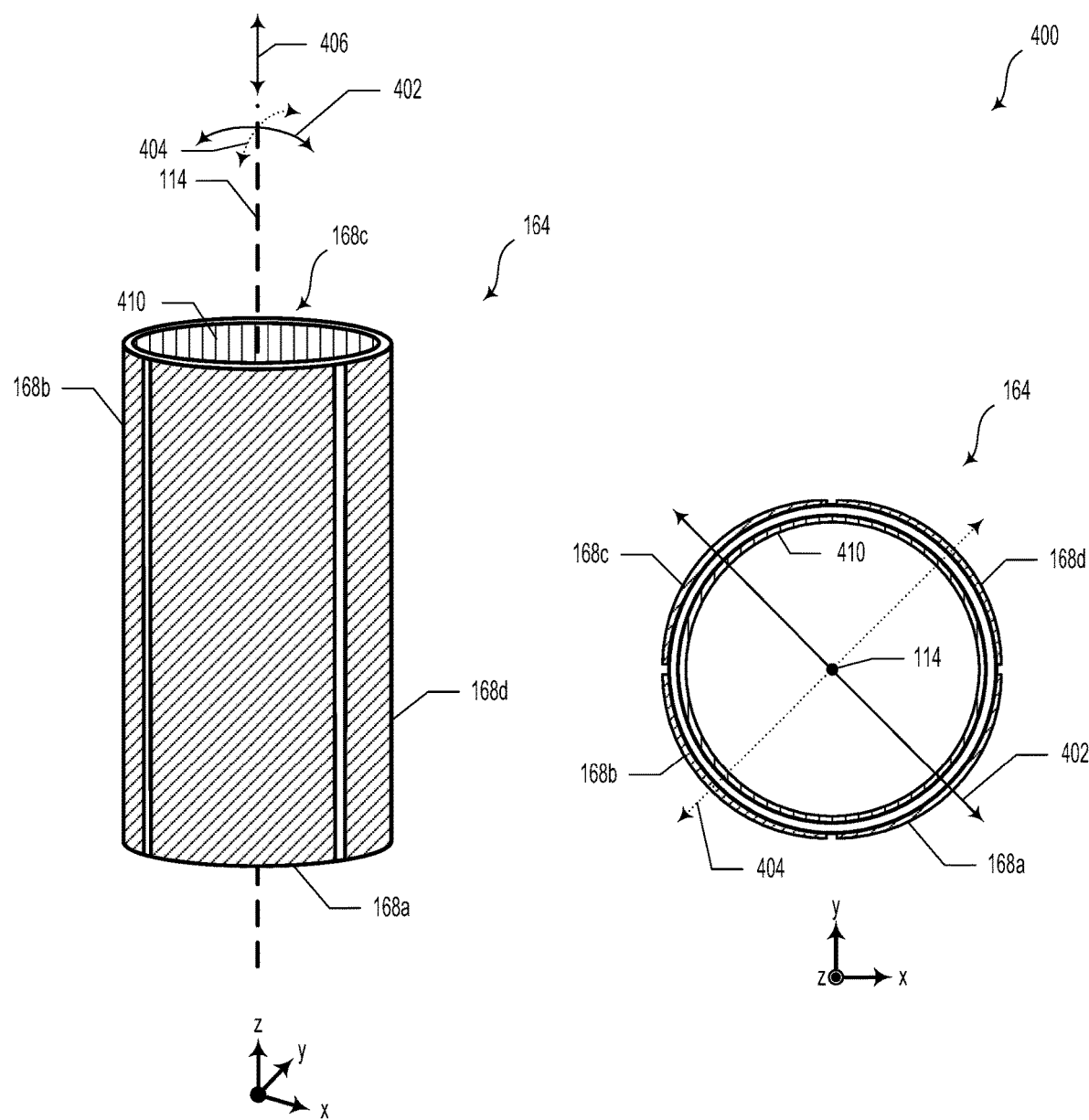
FIG. 4A illustrates a piezoelectric tube, in accordance with example embodiments.

FIG. 4A illustrates various views of a piezoelectric tube 400, according to an example embodiment. In some embodiments, piezoelectric tube 400 could be similar or identical to piezoelectric tube 164, as described herein. For example, the piezoelectric tube 400 could be disposed between the lens assembly 110 (or lens holder 120) and the substrate 130. As such, in some embodiments, the piezoelectric tube 400 could be configured to adjust a distance and/or an arrangement between the lens(es) 112 and the image sensor 140.

In various embodiments, the piezoelectric tube 400 could be shaped like a thin cylinder. In such scenarios, the piezoelectric tube 400 could be formed from radially-poled piezoelectric material with four external electrodes (e.g., piezoelectric elements 168a-d) and a continuous internal electrode (e.g., inner conductor 410). Other electrode arrangements are possible and contemplated. For example, in alternative embodiments, the piezoelectric tube 400 could include more or fewer piezoelectric elements and could include a continuous outer conductor. In some embodiments, the various conductors and/or electrodes could be formed from nickel, copper, and/or gold, although other conductive materials are possible and contemplated.

The piezoelectric tube 400 could be formed from a variety of piezoelectric materials, including, but not limited to, lead zirconate titanate (e.g., PZT), lithium niobate, barium titanate, potassium niobate, sodium tungstate, sodium potassium niobate, bismuth ferrite, among other possibilities.

In some embodiments, by adjusting a voltage bias between the inner conductor 410 and the respective piezoelectric elements 168a-d, the piezoelectric tube 400 could be configured to adjust its shape so as to tip 402, tilt 404, and/or increase or decrease length 406 in the axial direction (e.g., along optical axis 114). That is, when a voltage is applied to one of the external electrodes, the actuator wall expands, which may cause a vertical contraction and a lateral deflection of the tube tip. A circumferential electrode may be utilized for vertical and/or radial extension and contraction. In some embodiments, the piezoelectric tube 400 could be similar or identical to those utilized in scanning probe microscopes and/or applications such as fiber stretching and/or beam scanning.

In such a manner, by controlling the control signal(s) (e.g., control signal 190) provided to the respective piezoelectric elements, a length and/or tip/tilt of the piezoelectric tube 400 can be adjusted with better-than-micron precision. As such, a distance between the image sensor 140 and the one or more lenses 112 can be controlled very precisely. Accordingly, temperature-dependent expansion/contraction effects due to differences in the CTE among various material of the optical system can be compensated.

Figure 4B:
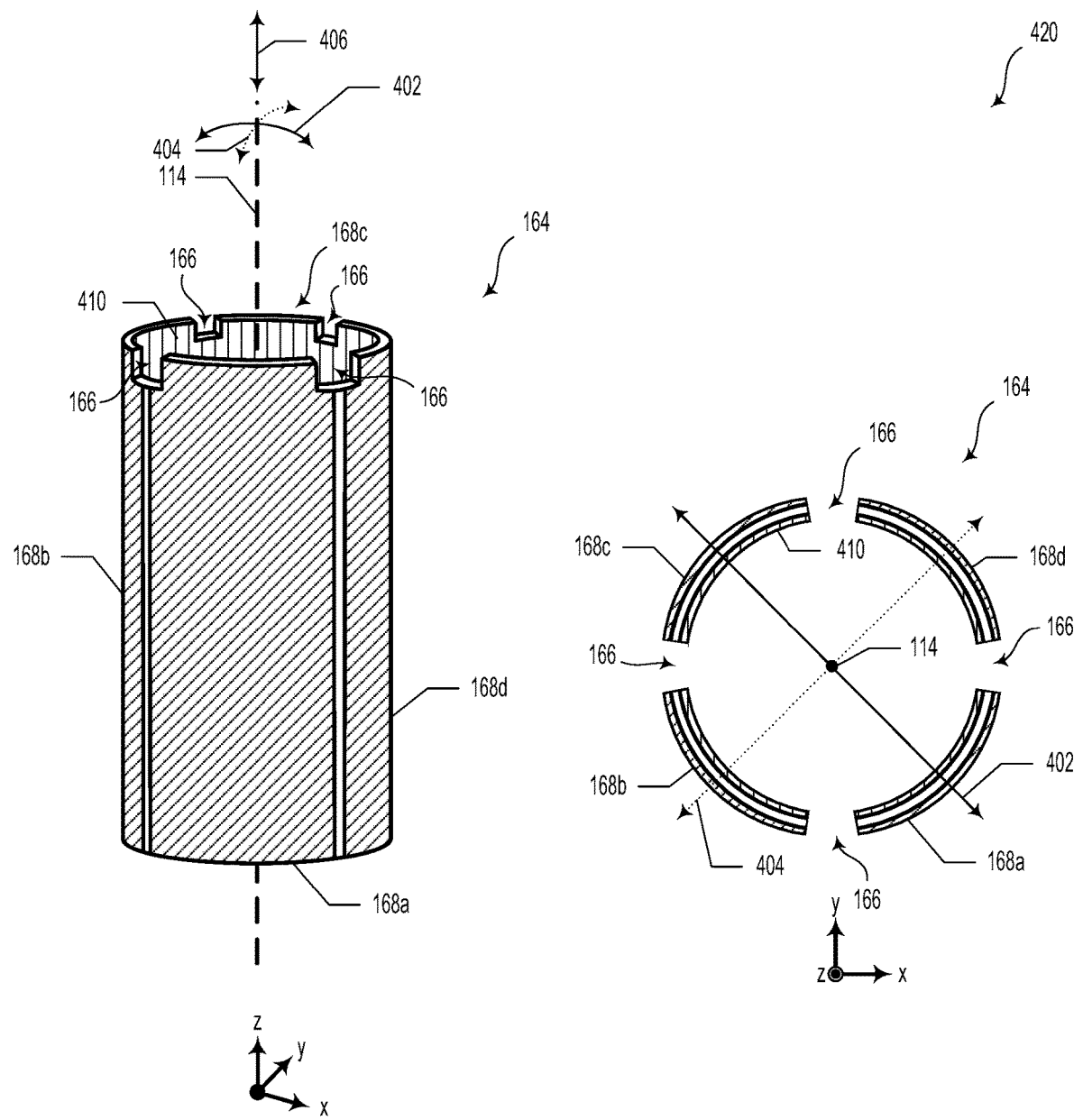
FIG. 4B illustrates a piezoelectric tube, in accordance with example embodiments.
Figure 5A:
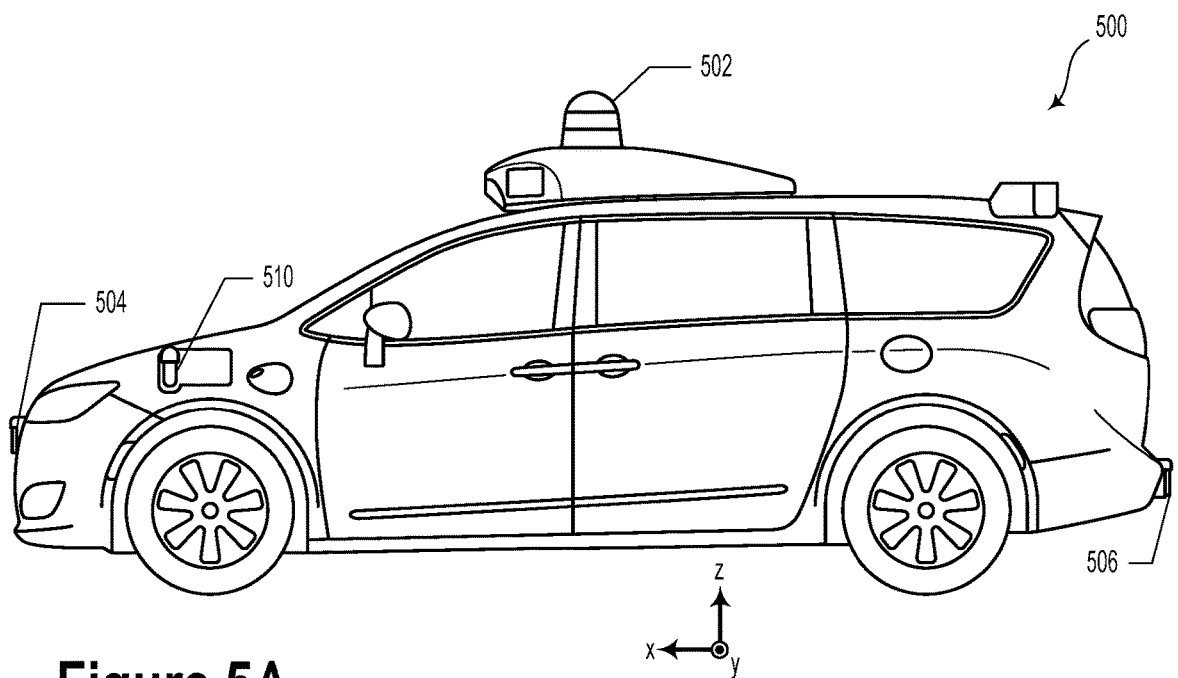
FIG. 5A illustrates a vehicle, in accordance with example embodiments.
Figure 5B:
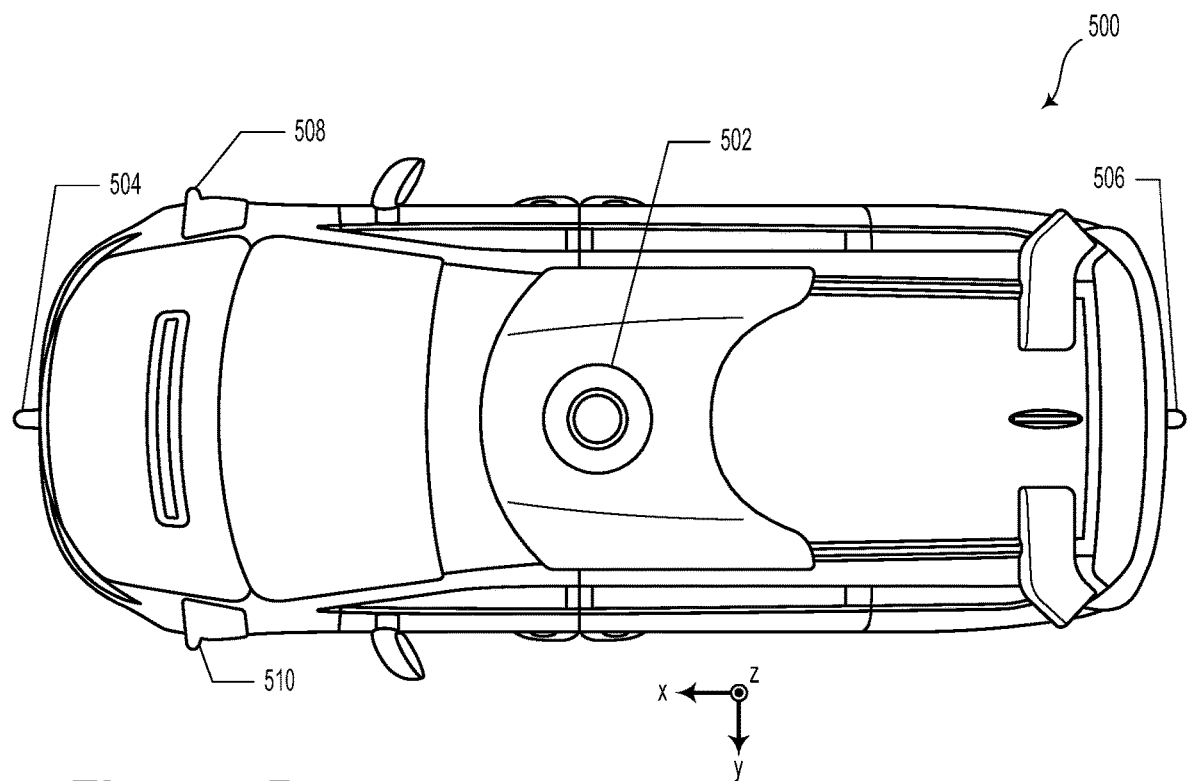
FIG. 5B illustrates a vehicle, in accordance with example embodiments.
Figure 5C:
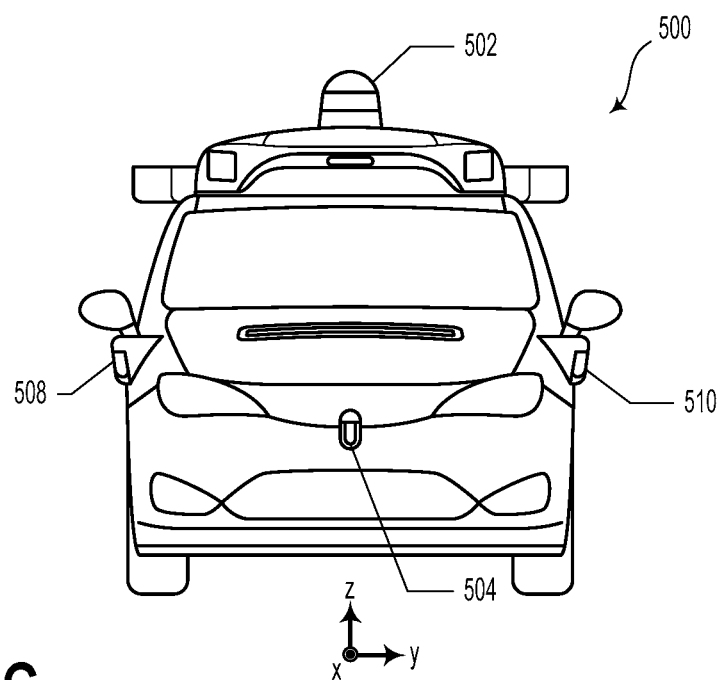
FIG. 5C illustrates a vehicle, in accordance with example embodiments.
Figure 5D:
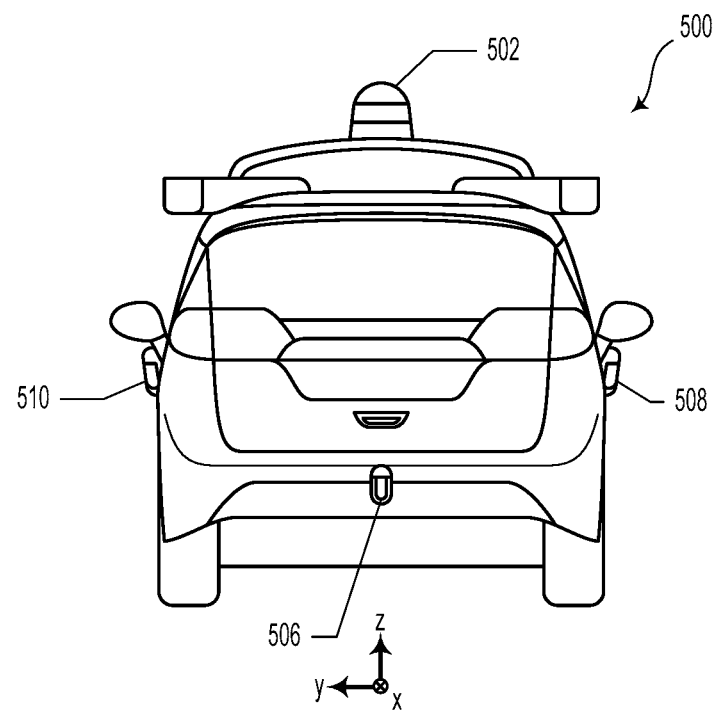
FIG. 5D illustrates a vehicle, in accordance with example embodiments.
Figure 5E:
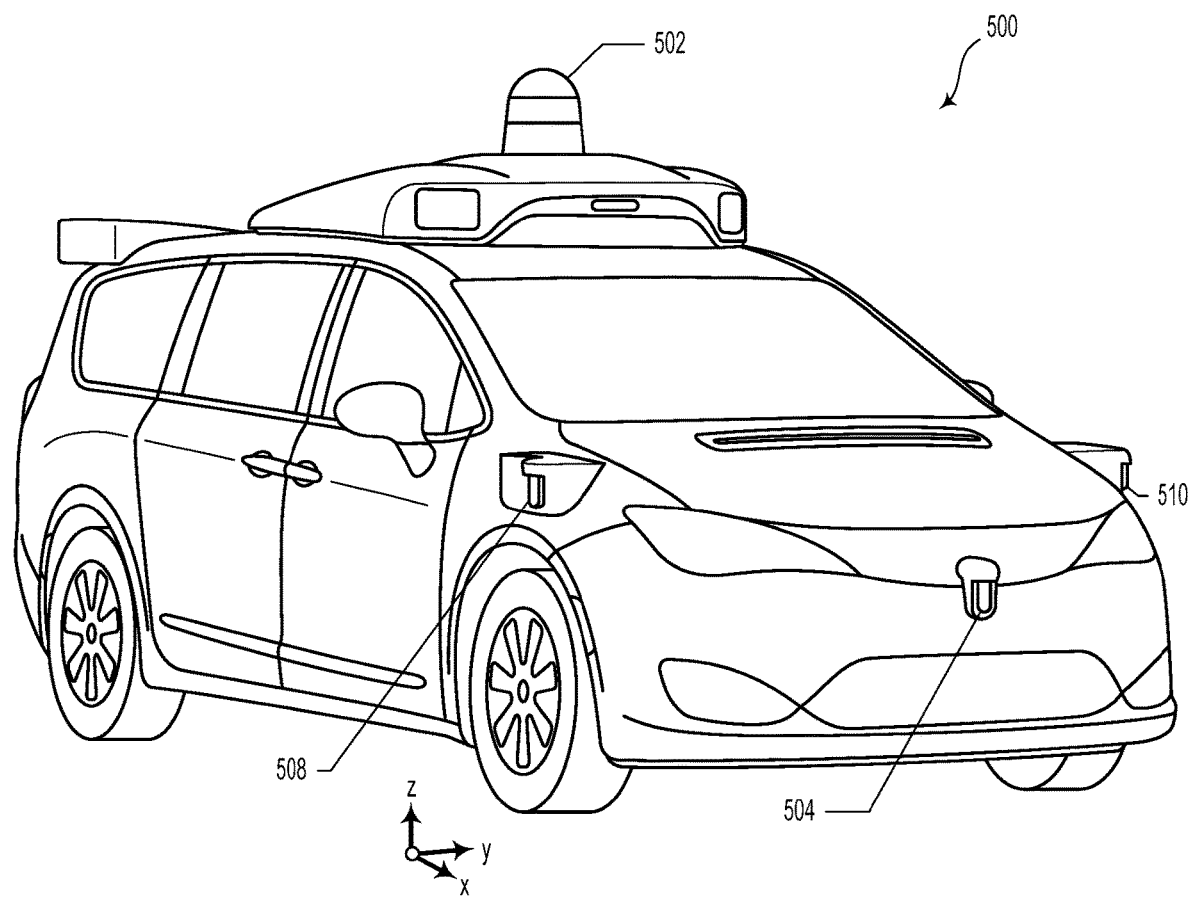
FIG. 5E illustrates a vehicle, in accordance with example embodiments.

FIG. 4B illustrates various views of a piezoelectric tube 420, according to an example embodiment. The piezoelectric tube 420 could be similar or identical to piezoelectric tube 164 and/or piezoelectric tube 400, as illustrated and described in relation to FIGS. 1 and 4A. In some embodiments, piezoelectric tube 420 could include a plurality of slot openings 166 along at least one end of the piezoelectric tube 420. While the slot openings 166 are illustrated as being disposed along one end of the piezoelectric tube 420, it will be understood that the slot openings 166 could be located elsewhere, such as along both ends of the piezoelectric tube 420. It will be understood that the slot openings 166 are not drawn to scale and could be sized differently with respect to the dimensions of the piezoelectric tube 420. For example, the slot openings 166 could be longer or shorter or wider or narrower with respect to the piezoelectric tube 420.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include optical systems 100, 200, 300 and/or 320 as illustrated and described in relation to FIGS. 1, 2A, 2B, 3A, and 3B. In other words, the optical systems described elsewhere herein could be coupled to the vehicle 500 and/or could be utilized in conjunction with various operations of the vehicle 500. As an example, the optical systems 100, 200, 300 and/or 320 could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, the one or more sensor systems 502, 504, 506, 508, and 510 could include image sensors. Additionally or alternatively the one or more sensor systems 502, 504, 506, 508, and 510 could include LIDAR sensors. For example, the LIDAR sensors could include a plurality of light-emitter devices arranged over a range of angles with respect to a given plane (e.g., the x-y plane). For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

While FIGS. 5A-5E illustrate various sensors attached to the vehicle 500, it will be understood that the vehicle 500 could incorporate other types of sensors.

It will be understood that optical systems 100, 200, 300, and 320 could be implemented with the LIDAR sensors and/or camera image sensors of vehicle 500 to compensate for thermal expansion effects that may otherwise negatively effect optical system performance. For example, the active compensation system 160 of such optical systems could be configured to adjust an axial position of the respective image sensors 140 with respect to the lens assembly 110 and/or respective lenses 112. It will be understood that the active compensation system 160 and/or optical systems described herein could be incorporated in other ways with respect to the vehicle 500.

IV. Example Methods

Figure 6:
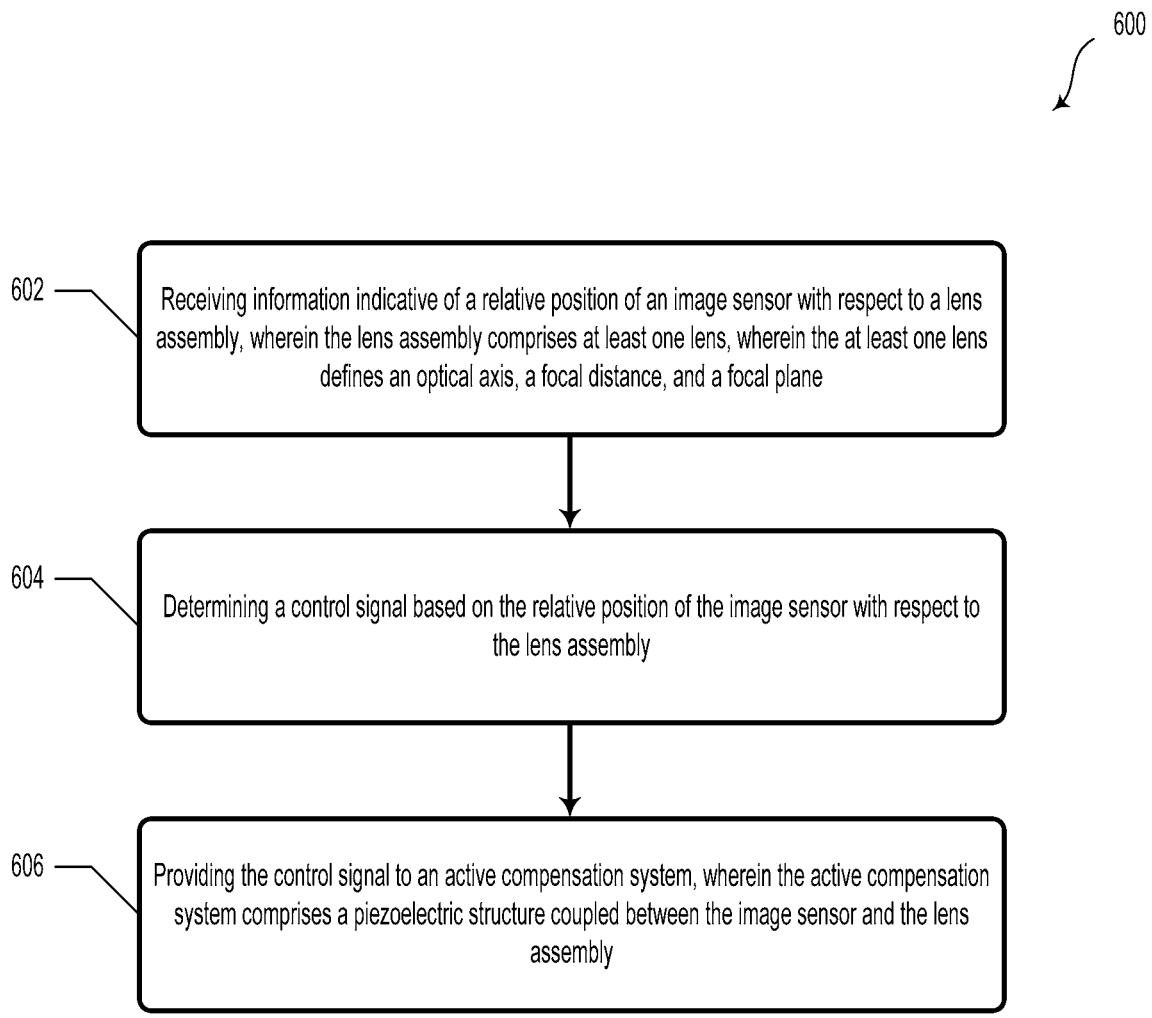
FIG. 6 illustrates a method, in accordance with example embodiments.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of optical systems 100, 200, 300, and 320 as illustrated and described in relation to FIGS. 1, 2A, 2B, 3A, and 3B.

Block 602 includes receiving information indicative of a relative position of an image sensor (e.g., image sensor 140) with respect to a lens assembly (e.g., lens assembly 110). The lens assembly includes at least one lens (e.g., lens(es) 112). The at least one lens defines an optical axis (e.g., optical axis 114), a focal distance (e.g., focal distance 116), and a corresponding focal plane (e.g., focal plane 118).

Block 604 includes determining a control signal (e.g., control signal 190) based on the relative position of the image sensor with respect to the lens assembly.

Block 606 includes providing the control signal to an active compensation system (e.g., active compensation system 160). The active compensation system includes a piezoelectric structure (e.g., piezoelectric tube 164 and/or piezoelectric linear actuator(s) 195) coupled between the image sensor and the lens assembly.

In some embodiments, receiving the information indicative of the relative position of the image sensor with respect to the lens assembly could include receiving, from a temperature sensor (e.g., thermal sensor 170), a current temperature of at least one of: the image sensor, the lens assembly, or the piezoelectric structure. In such scenarios, determining the control signal could be based, at least in part, on the current temperature.

Additionally or alternatively, in some embodiments, receiving the information indicative of the relative position of the image sensor with respect to the lens assembly could include receiving the information indicative of the relative position of the image sensor with respect to the lens assembly from a position sensor (e.g., position sensor 180). In such scenarios, determining the control signal could be based, at least in part, on the relative position of the image sensor with respect to the lens assembly. For example, the position sensor could provide information about whether the image sensor is properly arranged with respect to the one or more lenses.

In some embodiments, method 600 may additionally include determining a desired position shift of the image sensor with respect to the lens assembly. In such scenarios, determining the control signal could be based, at least in part, on the desired position shift of the image sensor with respect to the lens assembly.

In various examples, providing the control signal to the active compensation system could include causing the active compensation system to adjust at least one of: a tip, a tilt, or a distance between the image sensor and the lens assembly.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
a lens assembly comprising at least one lens, wherein the at least one lens defines an optical axis, a focal distance, and a focal plane;
a lens holder coupled to the lens assembly;
a substrate having a first surface;
an image sensor attached to the first surface of the substrate; and
an active compensation system comprising a piezoelectric structure coupled between the lens holder and the first surface of the substrate, wherein the piezoelectric structure comprises at least two piezoelectric actuators positioned at different locations with respect to the first surface, and wherein each of the at least two piezoelectric actuators is configured to (i) apply a respective axial force and (ii) be separately controlled to adjust an angle of the image sensor with respect to the focal plane and the at least one lens.

2. The optical system of claim 1, wherein the optical system comprises a camera system or a light detection and ranging (LIDAR) system.

3. The optical system of claim 1, wherein the active compensation system is configured to maintain the image sensor at the focal plane over a predetermined temperature range that includes at least a temperature range of −30 to 65° C.

4. The optical system of claim 1, further comprising a thermal sensor configured to provide information indicative of a current temperature of at least a portion of the optical system, wherein at least one property of the active compensation system is configured to be adjusted based on the current temperature.

5. The optical system of claim 1, further comprising a position sensor configured to provide information indicative of a relative position of the image sensor with respect to the lens assembly, wherein at least one property of the active compensation system is configured to be adjusted based on the relative position of the image sensor with respect to the lens assembly.

6. The optical system of claim 1, wherein at least a portion of the piezoelectric structure is arranged coaxially about the optical axis.

7. The optical system of claim 1, wherein the at least two piezoelectric actuators comprise two or more stacks each comprising two or more linear piezoelectric actuators.

8. The optical system of claim 1, further comprising:
a housing connected to the lens holder such that a chamber is defined between the housing, the lens assembly, and the lens holder, wherein the chamber contains the substrate, the image sensor, and the active compensation system; and
a spring disposed between the housing and the substrate to bias the substrate towards the lens assembly and preload the piezoelectric structure.

9. The optical system of claim 1, wherein the piezoelectric structure comprises a piezoelectric tube, and wherein the at least two piezoelectric actuators comprise two or more piezoelectric elements disposed at respective angular positions on a surface of the piezoelectric tube.

10. The optical system of claim 9, wherein the piezoelectric tube comprises a plurality of slot openings along at least one end of the piezoelectric tube, wherein the plurality of slot openings is configured to reduce thermally-induced radial strain in the piezoelectric tube.

11. The optical system of claim 9, wherein the piezoelectric tube is electrically coupled to the lens holder with a conductive epoxy.

12. The optical system of claim 1, wherein the at least two piezoelectric actuators are further configured to be controlled to adjust a distance between the at least one lens and the image sensor.

13. The optical system of claim 1, wherein adjusting an angle of the image sensor with respect to the focal plane comprises adjusting one or more of: (i) a tip of the image sensor with respect to the focal plane and the at least one lens or (ii) a tilt of the image sensor with respect to the focal plane and the at least one lens.

14. The optical system of claim 1, further comprising a controller having at least one processor and a memory, wherein the at least one processor executes program instructions stored in the memory so as to carry out operations, the operations comprising:
determining a control signal to compensate for a thermal focus shift between the at least one lens and the image sensor; and
providing the control signal to the active compensation system.

15. The optical system of claim 14, further comprising a temperature sensor, wherein the operations further comprise:
receiving, from the temperature sensor, information indicative of a current temperature of at least a portion of the optical system, wherein determining the control signal is based on the current temperature.

16. The optical system of claim 14, further comprising a position sensor, wherein the operations further comprise:
receiving, from the position sensor, information indicative of a relative position of the image sensor with respect to the lens assembly, wherein determining the control signal is based on the relative position of the image sensor with respect to the lens assembly.

17. A method, comprising:
receiving information indicative of a relative position of an image sensor with respect to a lens assembly, wherein the lens assembly comprises at least one lens, wherein the at least one lens defines an optical axis, a focal distance, and a corresponding focal plane;
determining a control signal based on the relative position of the image sensor with respect to the lens assembly; and
providing the control signal to an active compensation system, wherein the active compensation system comprises a piezoelectric structure coupled between the image sensor and the lens assembly, and wherein the piezoelectric structure comprises at least two piezoelectric actuators positioned at different locations with respect to the image sensor, wherein each of the at least two piezoelectric actuators is configured to apply a respective axial force, and wherein providing the control signal comprises separately controlling each of the at least two piezoelectric actuators to adjust an angle of the image sensor with respect to the corresponding focal plane and the at least one lens.

18. The method of claim 17, wherein receiving the information indicative of the relative position of the image sensor with respect to the lens assembly comprises receiving, from a temperature sensor, a current temperature of at least one of: the image sensor, the lens assembly, or the piezoelectric structure, and wherein determining the control signal is based on the current temperature.

19. The method of claim 17, wherein adjusting the angle of the image sensor with respect to the corresponding focal plane comprises adjusting at least one of: (i) a tip of the image sensor with respect to the corresponding focal plane and the at least one lens, or (ii) a tilt of the image sensor with respect to the corresponding focal plane and the at least one lens.

* * * * *